3,546,231
Patented Dec. 8, 1970

3,546,231
CERTAIN 2-[PYRIDYL-3-THIOCARBAMOYL-1,3-OXAZOLIDINES]
George G. King, Guilford, and Joseph V. Karabinos, Orange, Conn., assignors, by mesne assignments, to The Ansul Company, a corporation of Wisconsin
No Drawing. Filed May 3, 1968, Ser. No. 726,568
Int. Cl. C07d 31/50
U.S. Cl. 260—294.8        4 Claims

ABSTRACT OF THE DISCLOSURE

Substituted oxazolidines having the formula

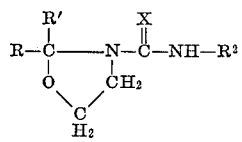

wherein R is aryl, nitroaryl, haloaryl, alkoxyaryl, pyridyl, alkylenedioxyaryl, cycloaliphatic, hydroxycycloaliphatic, aryloxyalkyl or alkylcarbamoyloxyaryl; R' is hydrogen or alkyl; $R^2$ is alkyl, cycloaliphatic, alkenyl or carbalkoxyalkyl; and X is oxygen or sulfur are prepared by reacting N-(2-hydroxyethyl)-substituted imines with various isocyanates and isothiocyanates. These substituted oxazolidines are particularly valuable insecticides and herbicides.

This invention relates to a series of substituted oxazolidines prepared by reacting selected isocyanates and isothiocyanates with N-(2 - hydroxyethyl) - substituted imines. More particularly, this invention relates to 2-substituted-3-substituted carbamoyl- and thiocarbamoyl-1,3-oxazolidines having the formula

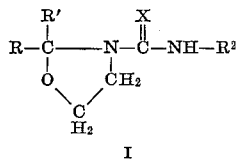
I wherein R is aryl, nitroaryl, haloaryl, alkoxyaryl, pyridyl, alkylenedioxyaryl, cycloaliphatic, hydroxycycloaliphatic, aryloxyalkyl or alkylcarbamoyloxyaryl; R' is hydrogen or alkyl; $R^2$ is alkyl, cycloaliphatic, alkenyl or carbalkoxyalkyl; and X is oxygen or sulfur.

Various oxazolidine derivatives have been previously prepared and reported in the literature. Thus, R. A. Henry et al. in J. Am. Chem. Soc., 71, 2297 (1949) report derivatives prepared by reacting 2-phenyloxazolidine with phenyl isocyanate and α-naphthyl isocyanate respectively.

Now it has been found in accordance with this invention that oxazolidines having substituents in the 2-position and non-aryl substitution at the carbamoyl nitrogen have valuable biological properties.

The substituted oxazolidines of this invention are prepared by reacting N-(2-hydroxyethyl)-substituted imines with various isocyanates and isothiocyanates in accordance with the following general equation wherein R, R', $R_2$ and X are as previously described.

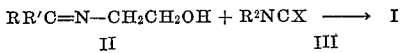

The N-(2-hydroxyethyl)-substituted imines II employed in the practice of this invention are readily prepared by reacting equimolar amounts of ethanolamine with the appropriate aldehydes in refluxing solvent as described by E. D. Bergmann, Chem. Rev. 53, 309 (1953).

Illustrative N-(2-hydroxyethyl)-substituted imines are those compounds II wherein R is phenyl, nitrophenyl, halophenyl, alkoxyphenyl, pyridyl, alkylenedioxyphenyl, cycloaliphatic, hydroxycycloaliphatic or alkylcarbamoyloxyphenyl; and R' is hydrogen or alkyl.

Representatives of these compounds are the N-(2-hydroxyethyl)-benzalamines such as: N-(2-hydroxyethyl)-benzalamine, N - (2-hydroxyethyl)-2-chlorobenzalamine, N-(2-hydroxyethyl)-2,6-dichlorobenzalamine, N - (2-hydroxyethyl)-2,4,6-trichlorobenzalamine, N - (2-hydroxyethyl)-2-bromobenzalamine, N - (2-hydroxyethyl)-2-fluorobenzalamine, N - (2-hydroxyethyl)-4-iodobenzalamine, N-(2-hydroxyethyl)-4-nitrobenzalamine, N - (2-hydroxyethyl)-2,6-dinitrobenzalamine, N-(2-hydroxyethyl)-2,4,6-trinitrobenzalamine, N-(2-hydroxyethyl)-4-ethoxybenzalamine, N-(2-hydroxyethyl)-4-n-butoxybenzalamine, N-(2-hydroxyethyl)-4 - isopentoxybenzalamine, N - (2-hydroxyethyl)-3,4-methylenedioxybenzalamine, N - (2-hydroxyethyl)-3,4 - ethylenedioxybenzalamine, N - (2-hydroxyethyl)-3,4-n-butylenedioxybenzalamine, N - (2-hydroxyethyl)-2-methylcarbamoyloxybenzalamine, N-(2-hydroxyethyl)-3-n-proplycarbamoyloxybenzalamine, N - (2-hydroxyethyl)-acetophenone imine, N-(2-hydroxyethyl)-4-chloroacetophenone imine, N-(2-hydroxyethyl)-propriophenone imine, N-(2-hydroxyethyl)-4-chloropropriophenone imine and N-(2-hydroxyethyl)-butyrophenone imine.

Other N-(2-hydroxyethyl)-substituted imines having the general Formula II are represented by compounds such as N-(2-hydroxyethyl)-3-pyridylemethyleneamine, 1-[N-(2-hydroxyethyl)-acetimidoyl]cyclohexanol, N - (2-hydroxyethyl)-2- pyridylmethyleneamine, N-(2-hydroxyethyl)-4-pyridylemethyleneamine, N-(2-hydroxyethyl)-3-hydroxy-3-methyl-2-butanone imine, N-(2-hydroxyethyl)-3-hydroxy-3-methyl-2-pentanone imine, N-(2-hydroxyethyl)-3-hydroxy-3-ethyl-2-pentanone imine, N-(2-hydroxyethyl)-3-hydroxy-3-phenyl-2-butanone imine and 1-[N-(2-hydroxyethyl)-acetimidoyl]cyclopentanol.

Preferred N-(2-hydroxyethyl)-substituted imines include those compounds having the Formula II wherein R is halophenyl, pyridyl, alkylenedioxyphenyl wherein the alkylene moiety has 1 to 3 carbon atoms, cycloaliphatic having 4 to 8 carbon atoms, and hydroxycycloaliphatic having 4 to 8 carbon atoms; and R' is hydrogen or lower alkyl, i.e., alkyl having 1 to 4 carbon atoms.

A variety of isocyanates and isothiocyanates III can be employed in the preparation of the substituted oxazolidines of this invention. Thus illustrative isocyanates and isothiocyanates include those compounds III wherein $R^2$ is alkyl. For example, methyl isocyanate, ethyl isocyanate, isopropyl isocyanate, n-pentyl isocyanate, n-octyl isocyanate, dodecyl isocyanate and the corresponding isothiocyanates may be suitably employed. However, preferred embodiments employ those compounds III wherein R is lower alkyl, i.e., alkyl having 1 to 4 carbon atoms.

Isocyanates and isothiocyanates having the Formula III wherein $R^2$ is cycloaliphatic include cyclobutyl isocyanate, cyclopentyl isocyanate, cyclohexyl isothiocyanate, cyclooctyl isocyanate, cyclododecyl isocyanate, etc. Particularly preferred are the cycloaliphatic compounds III having 4 to 8 carbon atoms in the cycloaliphatic moiety.

Compounds having the Formula III wherein R is alkenyl include allyl isocyanate, allyl isothiocyanate, propenyl isocyanate, butenyl isocyanate and pentenyl isocyanate. Preferred are those compounds wherein $R^2$ is alkenyl having 3 to 5 carbon atoms.

Isocyanates and isothiocyanates III wherein R is carbalkoxyalkyl include ethylisocyanatoacetate, n-propylisocyanatoacetate, n-butylisocyanatoacetate, ethylisocyanatopropionate, methylisocyanatobutyrate, etc. Preferred in this class are those compounds III having a total of 3 to 8 carbon atoms.

The substituted oxazolidines I are readily prepared by reacting the N-(2-hydroxyethyl)-substituted imines II with the appropriate isocyanates or isothiocyanates III at a temperature between about 20° C. and 140° C. and preferably between about 40° and 80° C.

While the reaction proceeds satisfactorily in the absence of a solvent, inert diluents are preferably employed. Thus, alkanes such as pentane, hexane, etc.; aromatics such as benzene, toluene, xylene; ethers such as ethylether, etc. can be suitably employed.

The preparation of the substituted oxazolidines I proceeds satisfactorily in the absence of a catalyst. However, catalysts such as pyridine, triethylamine, stannous octoate and triethylenediamine can be suitably employed. While the proportion of catalyst is not critical, generally between about 0.01 and 0.4 mole are employed per mole of N-(2-hydroxyethyl)-substituted imine II.

The substituted oxazolidines I are obtained in good yield and excellent purity and are readily isolated by conventional means such as filtration, recrystallization, and the like.

The compounds I of this invention have a wide variety of useful applications. They are particularly valuable in view of their biological properties. Thus, they exhibit strong pesticidal activity as insecticides and herbicides. Generally, they are mixed with various adjuvants in these applications, and low concentrations of the compound are extremely effective.

For example, they are excellent contact insecticides for such insects as the fly and the Mexican bean beetle. Thus, 2-(o-chlorophenyl) - 3 - methylcarbamoyl-1,3-oxazolidine; 3-methylcarbamoyl - 2 - (3,4 - methylenedioxyphenyl) - 1,3 - oxazoline; 2-(3,4-dichlorophenyl)-3-(carbethoxymethylcarbamido) - 1,3 - oxazolidine; 3-methylcarbamoyl-2-(2-methylcarbamoyloxyphenyl) - 1,3 - oxazolidine; 2-[1-(1-hydroxycyclohexyl)] - 2 - methyl-3-allylthiocarbamoyl-1,3-oxazolidine; 3-(allylthiocarbamoyl)-2,(3-pyridyl)-1,3-oxazolidine; 3-(allylthiocarbamoyl)-2-(3,4-methylenedioxyphenyl)-1,3-oxazolidine and 3-allylthiocarbamoyl - 2 - (2 - chlorophenyl)-1,3-oxazolidine were effective in killing flies and Mexican bean beetles when applied in an insecticidal solution containing .1% by weight of the insecticide.

The compounds I of this invention are also valuable pre-emergence herbicides. Thus, 3 - methylcarbamoyl-2-(3-nitrophenyl) - 1,3 - oxazolidine; 2-(3',4'-dimethoxyphenyl) - 3 - methylcarbamoyl-1,3-oxazolidine; 3-methylthiocarbamoyl - 2 - (3 - nitrophenyl)-1,3-oxazolidine; 3-(N-ethylthiocarbamoyl) - 2 - [1-(1-hydroxycyclohexyl)]-2-methyl - 1,3 - oxazolidine; 2-(2,5-dimethoxyphenyl)-3-methylthiocarbamoyl - 1,3 - oxazolidine and 3-ethylthiocarbamoyl - 2 - (3,4 - methylenedioxyphenyl)-1,3-oxazolidine were effective in controlling mustard and pigweed at a rate of application of 20 pounds per acre.

The post-emergence herbicidal effectiveness of compounds I is illustrated by the control of mustard and pigweed by 3-methylthiocarbamoyl - 2 - (3 - pyridyl)-1,3-oxazolidine; 2-(3,4-methylenedioxyphenyl - 3 - methylthiocarbamoyl - 1,3 - oxazolidine; 2-(2-chlorophenyl)-3-methylthiocarbamoyl - 1,3 - oxazolidine; 3 - (chlorohexylthiocarbamoyl) - 2 - (3 - pyridyl)-1,3-oxazolidine; 3-(chlorohexylthiocarbamoyl) - 2 - (2 - chlorophenyl)-1,3-oxazolidine and 2 - [1 - (1 - hydroxycyclohexyl)]-2-methyl-3-cyclohexylthiocarbamoyl-1,3-oxazolidine.

The following examples are presented to illustrate the preparation of various substituted oxazolidines I in accordance with the practice of this invention.

EXAMPLE 1

N-(2-hydroxyethyl) - 4 - chlorobenzalamine was prepared by reacting p-chlorobenzaldehyde (28.1 g., 0.20 mole) with ethanolamine (12.2 g., 0.20 mole) in 50 ml. of refluxing ethanol as reported by E. D. Bergmann in Chem. Revs., 53, 309 (1953).

Methyl isocyanate (5.7 g., 0.1 mole) was added dropwise to a boiling 1:1 hexane-ether solution of N-(2-hydroxyethyl) - 4 - chlorobenzalamine (18.3 g., 0.1 mole) and 4 ml. of triethylamine. After completion of the addition, the reaction mixture was refluxed for 4 hours and then allowed to stand overnight. The volatiles were removed by rotary evaporation to provide 5 g. of a white solid, M.P. 118–20° C. The following analytical data revealed that 2-(p-chlorophenyl)-3-methylcarbamoyl-1,3-oxazolidine had been obtained.

*Analysis.*—Calcd. for $C_{11}H_{13}ClN_2O_2$ (percent): C, 54.89; H, 5.44; N, 11.64. Found (percent): C, 54.72; H, 5.27; N, 11.64.

EXAMPLE 2

Methyl isocyanate (7.5 g., 0.13 mole) was added dropwise with stirring to a boiling ether solution of N-(2-hydroxyethyl)-2 - chlorobenzalamine (18.3 g., 0.10 mole) containing 1 ml. pyridine. After completion of the addition, the reaction mixture was refluxed for 5 hours. Upon cooling, a granular white solid separated from the reaction mixture. Filtration provided 16.3 g. of white solid, M.P. 120–3° C. The following analytical data revealed that 2-(o-chlorophenyl)-3-methylcarbamoyl-1,3-oxazolidine had been obtained.

*Analysis.*—Calcd. for $C_{11}H_{13}ClN_2O_2$ (percent): C, 54.89; H, 5.44; N, 11.64. Found (percent): C, 54.62; H, 5.27; N, 11.61.

EXAMPLE 3

To a well-stirred boiling 1:1 ether-acetone solution of N-(2-hydroxyethyl)-2,6 - dichlorobenzalamine (10.9 g., 0.050 mole) containing 2 ml. pyridine, methyl isocyanate (4.0 g., 0.070 mole) was added dropwise. The resulting solution was refluxed for 6 hours. The fine powdery white solid that separated on standing was collected and air dried to provide 10.4 g. of product; M.P. 145–151° C. The following analytical data revealed that 2-(2,6-dichlorophenyl)-3-methylcarbamoyl-1,3 - oxazolidine had been obtained.

*Analysis.*—Calcd. for $C_{11}H_{13}Cl_2N_2O_2$ (percent): C, 48.02; H, 4.40; N, 10.18. Found (percent): C, 47.88; H, 4.46; N, 10.15, 10.27.

EXAMPLE 4

To a boiling ether solution of N-(2-hydroxyethyl)-3-nitrobenzalamine (14.5 g., 0.075 mole) containing 0.1 g. triethylenediamine, methyl isocyanate (5.0 g., 0.087 mole) was added dropwise. The mixture was refluxed for 6 hours. Upon standing at room temperature, a powdery solid separated from the solution. Filtration provided 13.2 g. of white solid, M.P. 156–8° C. The following analytical data revealed that 3-methylcarbamoyl-2-(3-nitrophenyl)-1,3-oxazolidine had been obtained.

*Analysis.*—Calcd. for $C_{11}H_{13}N_3O_4$ (percent): C, 52.59; H, 5.22; N, 16.73; Found (percent): C, 52.49; H, 5.08; N, 16.86, 16.93.

EXAMPLE 5

To a boiling ether solution of N-(2-hydroxyethyl)-3,4-methylenedioxybenzalamine (19.2 g., 0.10 mole) containing 2 ml. pyridine, methyl isocyanate (7.7 g., 0.13 mole) was added dropwise. The clear solution was refluxed for 18 hours. Removal of the volatiles on a rotary evaporator provided 17.5 g. of a clear yellow oil. The following analytical data revealed that 3-methylcarbamoyl-2-(3,4-methylenedioxyphenyl) - 1,3 - oxazolidine had been obtained.

*Analysis.*—Calcd. for $C_{12}H_{14}N_2O_4$ (percent): C, 57.59; H, 5.64; N, 11.19. Found (percent): C, 57.87; H, 6.04; N, 11.02, 11.03.

EXAMPLE 6

To a boiling 1:1 ether:hexane solution of N-(2-hydroxyethyl)-3,4-dichlorobenzalamine (21.8 g., 0.10 mole) containing 2 ml. pyridine, n-butyl isocyanate (9.9 g., 0.10 mole) was added dropwise. The solution was refluxed for 6 hours. Removal of the volatiles gave 23.5 g. of a pale red oil. The following analytical data revealed that 2-(3,4- dichlorophenyl) - 3 - (n-butylcarbamoyl)-1,3-oxazolidine had been obtained.

*Analysis.*—Calcd. for $C_{14}H_{18}Cl_2N_2O_2$ (percent): Cl, 22.35; N, 8.83. Found (percent): Cl, 22.58, 22.33; N, 8.87, 8.93.

EXAMPLE 7

To a boiling 1:1 hexane-ether solution of N-(2-hydroxyethyl)-3,4-dichlorobenzalamine (21.8 g., 0.10 mole) containing 2 ml. pyridine, ethyl isocyanatoacetate (12.9 g., 0.10 mole) was added dropwise. The clear solution was refluxed for 6 hours. Removal of the volatiles gave 15.2 g. of a pale red oil. The following analytical data revealed that 2-(3,4 - dichlorophenyl) - 3-(carbethoxymethylcarbamoyl)-1,3-oxazolidine had been obtained.

*Analysis.*—Calcd. for $C_{14}H_{16}Cl_2N_2O_4$ (percent): Cl, 20.4; N, 8.07. Found (percent): Cl, 20.1; N, 8.16, 8.21.

EXAMPLE 8

An ethanol solution of N-(2-hydroxyethyl)-4-chlorobenzalamine (18.3 g., 0.10 mole) and cyclohexyl isothiocyanate containing 1 ml. pyridine was refluxed for 4 hours. Removal of the volatiles on a rotary evaporator gave 28.5 g. of a light brown oil. The following analytical data revealed that 2-(4-chlorophenyl)-3-cyclohexylthiocarbamoyl-1,3-oxazolidine had been obtained.

*Analysis.*—Calcd. for $C_{16}H_{21}ClN_2OS$ (percent): N, 8.62. Found (percent): N, 8.49.

EXAMPLE 9

An ethanol solution of 1 - [N - (2-hydroxyethyl)acetimidoyl] cyclohexanol (18.5 g., 0.10 mole), pyridine (1 ml.) and ethyl isothiocyanate (8.7 g., 0.10 mole) was heated for 4½ hours under reflux. Removal of the volatiles on a rotary evaporator provided 24 g. of yellow oil. The following analytical data revealed that 3-(N-ethylthiocarbamoyl)-2-[1-(1-hydroxycyclohexyl)] - 2-methyl-1,3-oxazolidine had been obtained.

*Analysis.*—Calcd. for $C_{13}H_{24}N_2O_2S$ (percent): N, 10.28. Found (percent): N, 10.35, 10.24.

EXAMPLE 10

An ethanol solution of 7.3 g. (0.10 mole) of methyl isothiocyanate, 1 ml. pyridine and 18.5 g. (0.10 mole) of 1 - [N-(2 - hydroxyethyl)acetimidoyl]cyclohexanol was heated under reflux for 4½ hours. Removal of the volatiles on a rotary evaporator provided 15.9 g. of a red oil. The following analytical data revealed that 2-[1-(1-hydroxycyclohexyl)] - 2 - methyl - 3-methylthiocarbamoyl-1,3-oxazolidine had been obtained.

*Analysis.*—Calcd. for $C_{12}H_{22}N_2O_2S$ (percent): C, 55.68; H, 8.57; N, 10.82. Found (percent): C, 55.61; H, 8.66; N, 10.85, 11.02.

EXAMPLE 11

An ethanol solution of 18.5 g. (0.10 mole) of 1-[N-(2-hydroxyethyl)-acetimidoyl] cyclohexanol, 9.9 g. (0.10 mole) allyl isothiocyanate and 1 ml. pyridine was refluxed for 6 hours. Removal of the volatiles on a rotary evaporator provided 23 g. of red oil. The following analytical data revealed that 2-[1-(1-hydroxycyclohexyl)]-2-methyl-3-allylthiocarbamoyl-1,3 - oxazolidine had been obtained.

*Analysis.*—Calcd. for $C_{14}H_{24}N_2O_2S$ (percent): N, 10.36. Found (percent): N, 10.05, 9.87.

Following the general procedure of the previous examples, the following compounds were made:

| Ex. | Name of compound | Melting point, °C. | Solvent | Catalyst |
|---|---|---|---|---|
| 12 | 2-(3′,4′-dimethoxyphenyl)-3-methylcarbamoyl-1,3-oxazolidine | 70-2 | Ether | Pyridine. |
| 13 | 3-methylcarbamoyl-2-(2-methylcarbamoyloxyphenyl)-1,3-oxazolidine | 162-4 | do | Do. |
| 14 | 2-(p-methoxyphenyl)-3-methylcarbamoyl-1,3-oxazolidine | 95-6 | do | Do. |
| 15 | 2-(p-chlorophenyl)-3-ethylcarbamoyl-1,3-oxazolidine | 87-9 | 1:1 hexane ether | Triethylamine. |
| 16 | 3-(methylthiocarbamoyl)-2-(3-nitrophenyl)-1,3-oxazolidine | 190-1 | Ethanol | |
| 17 | 3-methylthiocarbamoyl-2-(3-pyridyl)-1,3-oxazolidine | 180-2 | do | |
| 18 | 2-(3,4-methylenedioxyphenyl)-3-methylthiocarbamoyl-1,3-oxazolidine | 168-170.5 | do | |
| 19 | 2-(2-chlorophenyl)-3-methylthiocarbamoyl-1,3-oxazolidine | 179.5-80 | do | |
| 20 | 2-(4-chlorophenyl)-3-methylthiocarbamoyl-1,3-oxazolidine | 161-2 | do | |
| 21 | 2-(2,6-dichlorophenyl)-3-methylthiocarbamoyl-1,3-oxazolidine | 196-8 | do | Pyridine. |
| 22 | 2-(3,4-dichlorophenyl)-3-methylthiocarbamoyl-1,3-oxazolidine | 167-9 | do | Do. |
| 23 | 2-(2,5-dimethoxyphenyl)-3-methylthiocarbamoyl-1,3-oxazolidine | 139-42 | do | Do. |
| 24 | 2-(2,6-dichlorophenyl)-3-ethylthiocarbamoyl-1,3-oxazolidine | 185-6 | do | Do. |
| 25 | 2-(3,4-dichlorophenyl)-3-ethylthiocarbamoyl-1,3-oxazolidine | 161.5-63 | do | Do. |
| 26 | 3-ethylthiocarbamoyl-2-(3,4-methylenedioxyphenyl)-1,3-oxazolidine | 150-2 | do | Do. |
| 27 | 2-(2-chlorophenyl)-3-ethylthiocarbamoyl-1,3-oxazolidine | 136-8 | do | Do. |
| 28 | 3-(cyclohexylthiocarbamoyl)-2-(3-pyridyl)-1,3-oxazolidine | 149-150 | do | |
| 29 | 2-(3,4-dichlorophenyl)-3-cyclohexylthiocarbamoyl-1,3-oxazolidine | 122-4 | do | Do. |
| 30 | 3-(cyclohexylthiocarbamoyl)-2-(2-chlorophenyl)-1,3-oxazolidine | 122-4 | do | Do. |
| 31 | 3-(allylthiocarbamoyl)-2-(3-pyridyl)-1,3-oxazolidine | 113-115 | do | |
| 32 | 3-(allylthiocarbamoyl)-2-(3,4-methylenedioxyphenyl)-1,3-oxazolidine | 87-90 | do | Do. |
| 33 | 3-allylthiocarbamoyl-2-(2-chlorophenyl)-1,3-oxazolidine | 108-10 | do | Do. |
| 34 | 3-allylthio-2-(3,4-dichlorophenyl)-carbamoxy-1,3-oxazolidine | 105-7 | do | Do. |
| 35 | 2-(4-chlorophenyl)-3-allylthiocarbamoyl-1,3-oxazolidine | 96-8 | do | Do. |
| 36 | 2-[1-(1-hydroxycyclohexyl)]-2-methyl-3-cyclohexylthiocarbamoyl-1,3-oxazolidine | 163-7 | do | Do. |

What is claimed is:

1. A substituted oxazolidine having the following structure $$R-\underset{\underset{O}{|}}{\overset{\overset{R^1}{|}}{C}}-\underset{\underset{CH_2}{|}}{N}-\overset{\overset{X}{||}}{C}-NH-R^2$$

$$\underset{H}{\overset{}{\diagdown}}\overset{C}{\underset{H}{\diagup}}$$

wherein R is pyridyl, R′ is hydrogen or lower alkyl, $R^2$ is lower alkyl, cyclohexyl and allyl and X is sulfur.

2. The compound of claim 1 having the name 3-methylthiocarbamoyl-2-(3-pyridyl)-1,3-oxazolidine.

3. The compound of claim 1 having the name 3-allylthiocarmaboyl)-2-(3-pyridyl)-1,3-oxazolidine.

4. The compound of claim 1 having the name 3-cyclohexylthiocarbamoyl)-2-(3-pyridyl)-1,3-oxazolidine.

References Cited

UNITED STATES PATENTS 3,277,105   10/1966   Schmidt et al. _____ 260—295
3,480,640   11/1969   Wilhelm et al. _____ 260—296

ALAN L. ROTMAN, Primary Examiner

U.S. Cl. X.R.

260—295, 295.5, 307; 424—266, 272; 71—94, 88

UNITED STATES PATENT OFFICE
CERTIFICATE OF CORRECTION

Patent No. 3,546,231                                    December 8, 1970

George G. King et al.

It is certified that error appears in the above identified patent and that said Letters Patent are hereby corrected as shown below:

Column 1, line 63, "$R_2$" should read -- $R^2$ --. Column 2, line 21, "proplycarbamoyloxybenzalamine" should read -- propylcarbamoyloxybenzalamine --; line 32, "pyridylemethyleneam: should read -- pyridylmethyleneamine --.

Signed and sealed this 30th day of March 1971.

(SEAL)
Attest:

EDWARD M. FLETCHER, JR.                          WILLIAM E. SCHUYLER
Attesting Officer                                            Commissioner of P